July 16, 1929.  D. KONDAKJIAN  1,720,908
GLASS WORKING MACHINE
Filed March 3, 1928  3 Sheets-Sheet 1

Fig.1

INVENTOR
Daniel Kondakjian
BY
George D. Richards
ATTORNEY

July 16, 1929.  D. KONDAKJIAN  1,720,908
GLASS WORKING MACHINE
Filed March 3, 1928  3 Sheets-Sheet 2

INVENTOR
Daniel Kondakjian
BY
George D. Richards
ATTORNEY

July 16, 1929.　　D. KONDAKJIAN　　1,720,908
GLASS WORKING MACHINE
Filed March 3, 1928　　3 Sheets-Sheet 3
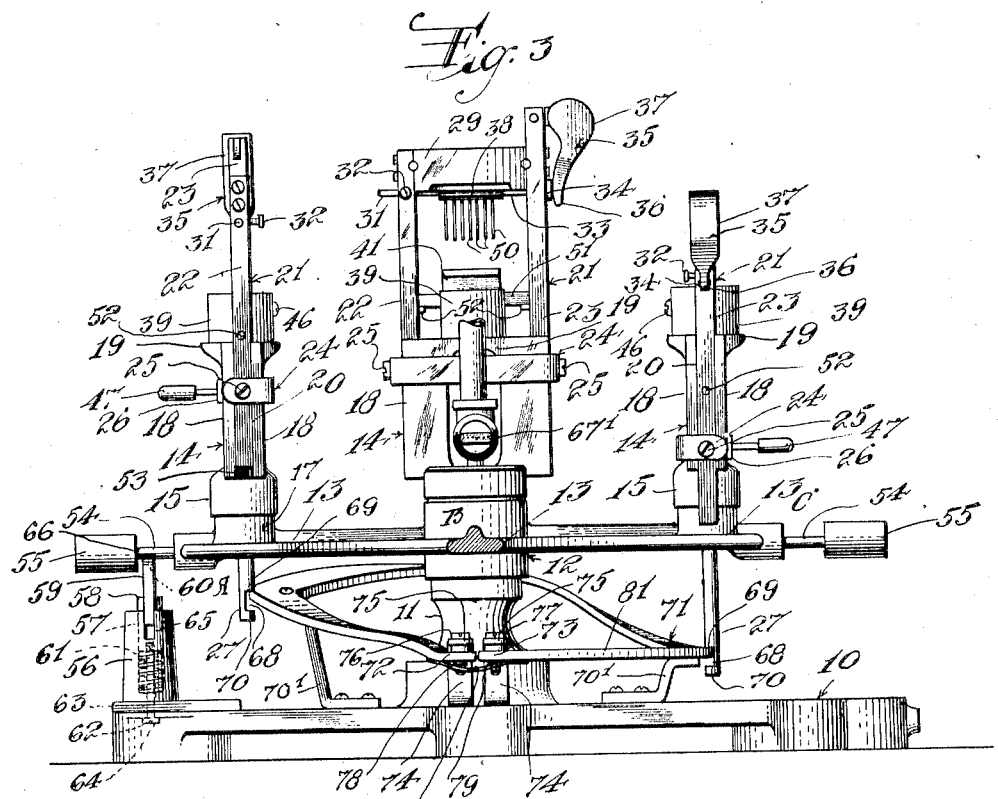
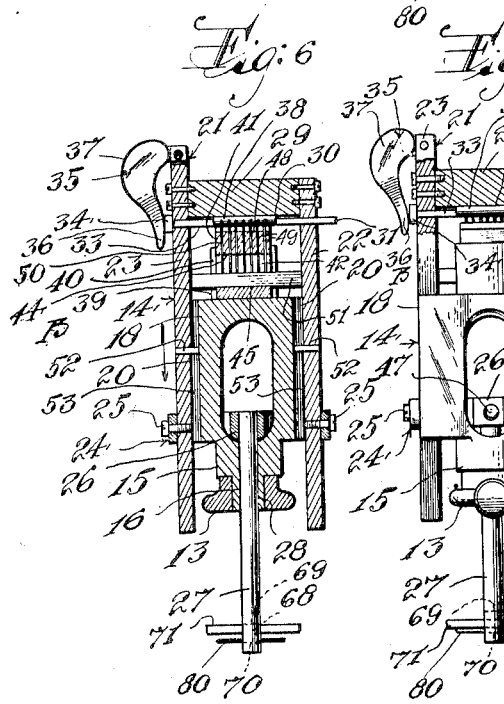
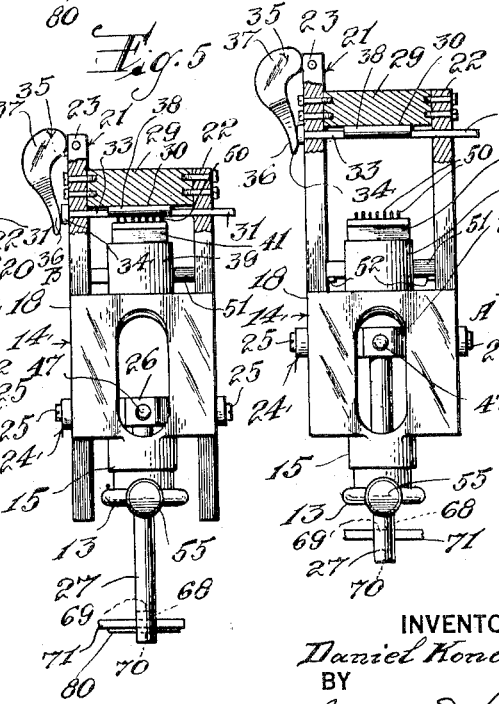
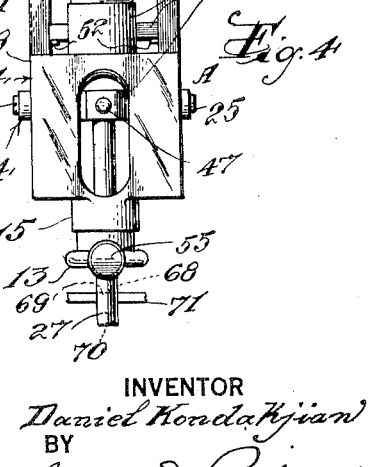
INVENTOR
Daniel Kondakjian
BY
George D. Richards
ATTORNEY Patented July 16, 1929.

1,720,908

UNITED STATES PATENT OFFICE.

DANIEL KONDAKJIAN, OF NEWARK, NEW JERSEY.

GLASS-WORKING MACHINE.

Application filed March 3, 1928. Serial No. 258,734.

The present invention relates, generally, to glass working machinery; and the invention relates, more particularly, to machines for fastening together glass and metal parts by melting the glass and then pressing the softened glass and the metal together to embed the metal in the glass.

An object of the invention is to provide, in a glass working machine, means for holding glass and metal parts under pressure and for heating the glass so held to melt it, whereby the metal and the glass are moved relative to each other to embed the metal in the molten glass.

Another object of the invention is to provide in a working machine means for carrying a piece of glass and a piece of metal to be embedded in the glass, for moving the pieces together automatically and for holding them against each other under a pressure while the glass is softened by heat which pressure becomes effective to embed the metal in the glass when the latter becomes softened.

Other objects and advantages of the invention will be apparent from the following description of an illustrative embodiment thereof and from the drawings; and the invention also consists in the novel arrangements, combinations and subcombinations of devices and parts set forth in the accompanying claims.

The invention is clearly illustrated in the accompanying drawings, in which:

Figure 1 is a plan view;

Figure 2 is an elevation view;

Figure 3 is a section view along line 3—3 of Figure 1;

Figures 4, 5 and 6 are diagrammatic views in elevation of the workholder at different stages in the operation of the machine; and Figure 7 is a perspective view of the parts assembled by the machine.

Similar characters of reference indicate corresponding parts throughout all the above described views.

Referring now to the drawing, the reference character 10 indicates a base which carries a central support post 11 on which rides the turnstile 12 which has the radial arms 13, 13, each of which latter carries near its outer end a work holder 14 comprising a boss 15 having a stud 16 which extends downwardly into a bore formed in a respective one of said arms 13, in which bore it is fastened by means of a set screw 17. Extending upwardly from said boss 15, in transversely spaced apart relation to each other, are the two guide and support members 18, 18 which, at their top, support between their upper ends the transverse member 19. Along the respective outer lateral edge each of said members 18, 18 has formed therein a vertical channel or guideway 20 which is rectangular in shape and extends through from the bottom edge to the top edge of its respective member 18.

Slidably movable vertically on said support members 18, 18 is a frame 21 comprising a pair of side members 22 and 23 which are rectangular in cross section and are mounted one in each of said guideways 20, 20 in which they have sliding fit. A cross member 24 extends from one side of said frame 21 to the other with its respective ends bent around the corners of said members 18, 18 and fixed to said members 22 and 23 by the screws 25, 25. A boss 26 fixed to said cross member 24 intermediate its ends and extending inwardly between said members 18, 18 carries fixed thereto by set screw 26' a rod 27 which projects downwardly and extends through a central bore 28 in said boss 15 and stud 16 for a distance to a point below its respective turnstile arm 13 for engagement with actuating means hereinafter fully described.

Fixed between said members 22 and 23 at their upper ends is the horizontal cross member 29, above which said member 23 extends for a short distance. In its lower surface said member 29 has formed therein a groove 30 which extends from said member 22 to said member 23. Extending through said member 22 into one end of said groove 30 is the pin 31 which is adjustably fixed in position by the set screw 32. Extending through said member 23 and slidably movable into one end of said groove 30 is the pin 33 which has a head 34 on its outer end for limiting its inward movement. An outwardly curved lever 35, pivoted at its upper end to the top end of said member 23, extends downwardly to a lower curved end 36 which engages said head 34 and has at its intermediate portion a lump or weight 37 formed thereon to give it weight at its outwardly curved portion which tends to move said curved end 36 downwardly and transversely toward said member 23, whereby when said pin 33 is moved outwardly it must be done so against the weight of said lever 35 and weight 37, and when it is released said weight 37 through said lever 35 will propel it inwardly toward said pin 31. Said pins 31 and 33 serve as clamping or holding members for a piece of glass such as the piece of rod or cane 38 positioned in said groove 30, and said lever 35 and weight 37 serve as means tending to hold said pin 33 in clamping engagement against said rod 38. The said groove 30 serves also to mold or form the glass piece held therein when it is softened and pressed, as hereinafter fully set forth.

Fixed to said cross member 19 and extending upwardly therefrom between said members 22 and 23, is the boss 39, which has the transverse slot 40 extending downwardly thereinto from the top. In said slot 40 is positioned the member 41 which has a wide slot 42 extending across it and inwardly from a lateral face thereof, whereby is defined between said slot 40 and slot 42 a vertical transverse slot 43 in which a lateral face of said slot 40 and the vertical face of said slot 42 serve as vertical guides and the top surface 44 and the bottom surface 45 of said slot 42 serve respectively as top and bottom stops. A set screw 46 serves to fix said member 41 in said slot 42. A handle 47 carried by said set screw 26' serves to manually move said frame 21 on said members 18, 18, when desired. The top surface of said member 41 has formed therein a longitudinal groove 48 designed to fit the lateral surface of a piece of glass rod or cane such rod 38. Extending from the bottom surface of said groove 48 downwardly through said member 41 to said slot 42 are a multiplicity of vertical bores 49, 49 having their upper ends longitudinally arranged along said groove 48. Said bores 49, 49 are designed each to receive a wire 50 to be embedded in a glass rod 38, held between said pins 31 and 33, in a manner and by means hereinafter fully described. As means for moving said wires 50, 50 vertically in said bores 49, 49, for purposes hereinafter set forth there is provided a bar 51 which extends through said slot 43 with its ends in sliding fit between said members 22 and 23. Said bar 51 has vertical sides which make sliding fit with the vertical sides of said slot 43 and has a flat upper surface for uniformly supporting said wires 50, 50. For moving said bar 51 upwardly in said slot 43 there is provided on said members 22 and 23 the inwardly projecting pins 52, 52 which in an upward position of said frame 21 on said members 18, 18 engages the respective ends of said bar 51 and supports it in raised position above the bottom of said slot 43.

A vertical slot 53 is provided in the inner face of each of said guideways 20, 20 to accommodate the vertical movement of said pins 52, 52.

Extending radially from the outer end of each of said arms 13, 13 is a rod 54 which at its outer end has a handle means 55. At one side of said frame 10 is fixed an upwardly projecting boss 56 in whose vertical central counter bore 57 is mounted the rod 58 which is slidable vertically therein. At its upper end said rod 58 carries fixed thereto a flat catch member 59 having in its upper surface a groove 60 adapted to engage any one of said rods 54, 54 positioned thereover and to hold it and said turnstile 12 against rotation. A compression spring 61 having its lower end seated against the bottom of said counterbore 57 and its upper end against the bottom of said rod 58 tends to move said catch member 59 into engaging position with relation to said rods 54, 54. A screw 62 passing through a bore 63 connecting from the bottom of said frame 10 at said boss 56 into said counterbore 57 and into threaded relation in said rod 58 has a head 64 which serves by engagement with the bottom of said frame 10 at said boss 56 to limit the upward movement of said rod 58 and catch member 59. For keeping said groove 60 aligned radially with respect to said arms 13, 13 said boss 56 extends upwardly to define a vertical guide slot 65 in which said catch member 59 moves. Said catch member 59 has its upper corners 66, 66 beveled off on each side of said groove 60 to provide sloping surfaces which said rods 54, 54 can engage when rotated thereagainst whereby said catch member 59 is depressed to permit a rod 54 to pass thereover. In such movement, when a rod 54 comes over said groove 60, said spring 61 will force said catch member 59 upwardly into locking engagement with said rod 54. The position at which this positioning means is mounted will be known hereafter as station A. The arms 13, 13 are four in number, equally spaced.

At ninety degrees in a counter-clockwise direction from said station A is provided a gas burner 67 which has two jets 67' 67' facing toward each other and spaced apart one on each side of the circumferential line of movement of said frames 21, 21 on their respective arms 13, 13, and aligned to have their flames meet and infringe against each other at a point just above the top of said member 41 whereby it will strike a piece of glass positioned between said member 41 and said member 19, when the latter is down against the former in an operation of the machine as hereinafter described. Each of said rods 27, 27 has formed therein near its lower end a transverse slot 68 facing said post 11 and having an upper transverse surface 69 facing downwardly and a lower transverse surface 70 facing upwardly and both adapted to serve as cam engaging surfaces.

Circumferentially positioned brackets 70', 70' with the center of said post 11 as a center is the cam ring 71 which in plan view follows the contour of a circle along its outer edge, the circumference of the circle extending between said cam engaging surfaces 69, 69 and 70, 70. In elevation said cam is of uniform thickness throughout its circumference and raises and lowers along its circumference for the purpose of imparting raising and lowering movement to said rods 27, 27 through their respective cam engaging surfaces 69, 70 in the manner and for the purpose hereinafter fully described.

At said station B said cam ring 71 is split and has its ends 72 and 73 slightly spaced apart to permit movement of one vertically relative to the other. Said ends 72 and 73 are supported by the support members 74 each positioned within the limits of said cam ring 71 and having an offset outer end 75 extending over the inner edge of said ring 71 at said ends 72, 73. Screws 76 and 77 pass slidably through openings in said ends 75 and into threaded relation with a respective one of said ends 72 and 73. Collars 78 and 79 fixedly mounted on a respective one of said screws 76 and 77 at a slight distance below a respective end 72 or 73 whereby turning of one of said screws 76 or 77 in one direction or the other will raise or lower said respective end. Spanning said ends 72, 73 is a strip spring 80 which has its ends fixed to said ring 71, one on either side of said ends 72 and 73. Said spring 80 bulges downwardly to form a resilient and downwardly pressing cam, which as hereinafter fully set forth, is compressible by parts of the machine and a glass piece to be worked, but which subsequently, when said glass piece is softened by heat from flames on said jets 67', 67', overcomes said compression and, tending to resume its original shape, moves said glass into embedding relation about the ends of wires held in said bores 49, 49.

From said station A said cam ring 71 slopes gradually toward said station B and just before it reaches the latter station and after it has passed the first end of said spring 80 it has a short and abrupt drop to said end 72. Said end 73 is adjusted to be at or just below the level of said end 72, and from this point on, the said cam ring 71 proceeds along a uniform level or dwell 81 through an arc of about ninety degrees to a station C which is diametrically opposite said station A. At or near said station C said cam ring 71 commences to rise to a maximum level 71 reached at a station D which is diametrically opposite said station B. From station D said cam ring 71 takes a short and gradual drop to said station A.

In the use and operation of the illustrative embodiment of the invention, above described and shown in the drawing, at said station A a piece of glass rod 38 is mounted between said pins 31 and 33 in clamped relation in which relation they are held by said weight 37. At this station said frame 21 is held by cam ring 71 at an intermediate position on said members 18, 18 with said member 19 at a distance below said member 29 and said glass rod 38. Wires 50, 50, to be embedded in said rod 38, are mounted one in each of said bores 49, 49 with their lower ends resting on said bar 51, which latter at this stage is resting on said bottom surface 45 of said slot 43.

The rod 54 is then released from said catch member 59 and the turnstile 12 is rotated by means of the handle to move said frame 21, with said glass rod 38 and wires 50, 50 mounted therein to said station B to bring said glass rod 38 between flames on said jets 67', 67'. During this movement from station A to station B said cam engaging surface 70 on said rod 17 will be successively engaged by said cam ring 71 and said spring 80 whereby said frame 21 is drawn down until said glass rod 38 engages the upper ends of said wires 50, 51 and they will be held under pressure in abutting relation by said spring 80. This loaded frame is held in locked position at station B by the engagement of said catch member 59 with the next successive turnstile arm 13 at station A, where the present frame 21 is loaded with a glass rod 38 and wires 50, 50 as above described.

While this loading is taking place the said rod 38 at station B is being heated and softened by the flames from said jets 67', 67' and as it becomes softened said spring 80 will pull it down onto the ends of said wires 50, 50 in embedding relation. This pressure of said spring 80, in addition to pressing said molten glass rod 38 onto the ends of said wires 50, 50, will press said rod 38 between the surfaces of said grooves 30 and 48 whereby it will be molded to substantially round shape. Of course, said spring 80 can be adjusted through said screws 76, 77 to apply just sufficient pressure and movement to said rod 38 to embed it about the ends of said wires 50, 50 without the further step of molding the rod.

After the rod 38 has been softened and moved in embedding relation about the ends of said wires 50, 50 at station B the turnstile 12 is rotated to bring the frame 21 carrying the assembled rod and wires from station B to station C, and to bring the next frame 21 with its load of glass rod and wire to station B.

During the movement from station B to station C over said dwell 81, and while at station C during the working of the next load, said frame 21 is held stationary on said members 18, 18 so that the rod 38 embedded about the ends of wires 50, 50 can cool and set thereon.

While the second set of wires 50, 50 are being embedded in this respective rod 38 the next frame 21 is loaded, and after the setting of the second set the turnstile 12 is again rotated to bring the third set to the flames, to bring the second set to station C, and to bring the first set to station D. During the movement of the first set from station C to station D said cam ring 71, through engagement with said cam engaging surface 69 on said rod 27, pushes the frame 21 upwardly on said members 18, 18 and said pins 52, 52 engage the ends of said bar 51 and lift it from the bottom surface 44 thereof. If said pins 31 and 33 hold said rod 38 tighter than said wires 50, 50 engages said bores 49, 49 then said rod 38 with the wires 50, 50 embedded therein will be lifted up from said member 19 and the wires pulled out from said bores 49, 49. If the wires engage said bores 49, 49 rather tightly then said pins 31 and 33 will slip from said rod 38 leaving it held by said wires 50, 50 which are in said bores 49, 49. Then, as said bar 51 is lifted by said pins 52, 52 after said member 29 is raised from said member 41, said wires 50, 50 will be raised thereby and pushed upwardly through said bores 49, 49 so that said glass rod 38 is raised above said groove 48. It can be seen then that when said first frame 21 reaches station D said rod 38 with wires 50, 50 are either held suspended by said pins 31 and 33 or are held in the raised position on said bar 51, from either of which positions they can readily be removed by the operator at station A, and at either station D or station A or therebetween. When said first frame 21 again reaches station A it is again loaded and the cycle of operations is repeated.

It is to be understood, of course, that the machine of the invention as above described can be operated by a Geneva gear or other arrangement to bring the frames 21, 21 successively to the stations A, B, C, and D, with periods of rests thereat sufficient for the loading and unloading operations, for the embedding of wires 50, 50 in rod 38 and for the cooling and setting of the glass afterward as above described.

I claim:—

1. In a glass working machine adapted for embedding the end of a metal part in a glass part, in combination; means for holding a glass part; means for holding a metal part; means for moving said glass part and said metal part relative to each other adapted to bring one against the other; means for yieldingly holding the glass part against the metal part under pressure; heating means for glass parts, means for moving said holding means to carry a glass part held thereby into operative relation with said heating means.

2. In a glass working machine adapted for embedding the end of a metal part in a glass part, in combination, means for holding a glass part; means for holding a metal part; cam means for moving said glass part and said metal part relative to each other adapted to bring one against the other and to hold the glass part against the metal part under pressure; heating means for glass parts; and means for moving said holding means to carry a glass part held thereby into operative relation with said heating means, while said cam means simultaneously moves said glass part into cooperating pressure relation with said metal part.

3. In a glass working machine adapted for embedding the end of a metal part in a glass part, in combination, means for holding a glass part, means for holding a metal part, means for moving said glass part against said metal part and adapted to hold the glass part against the metal part under resilient pressure; heating means for glass parts; and means for moving said holding means to carry a glass part held thereby into operative relation with said heating means, while said cam means simultaneously moves said glass part into cooperating pressure relation with said metal part.

4. In a glass working machine adapted for embedding the end of a metal part in a glass part, in combination, a work holder comprising means for holding a glass part and means for holding a metal part; means for moving said glass part holding means to bring a glass part against a metal part carried by said metal part holding means and for holding it thereagainst under pressure; heating means for glass parts; means for moving said work holder to carry a glass part held thereby into operative relation with said heating means; means for moving said work holder away from said heating means; and means operative upon movement of said work holder away from said heating means for moving said glass holding means away from said metal part holding means.

5. In a glass working machine adapted for embedding the end of a metal part in a glass part, in combination, a work holder comprising means for holding a glass part and means for holding a metal part, said glass holding means being movable on said work holder toward and from said metal part holding means; means for moving said glass part holding means to bring a glass part held thereby against a metal part held by said metal part holding means and to hold the glass part against the metal part under pressure; heating means for glass parts; means for moving said work holder to carry a glass part held thereby into operative relation with said heating means; means for moving said work holder away from said heating means; and means operative upon movement of said work holder away from said heating means for moving said holding means away from said metal part holding means; and means operable when said glass part holding means is moved away from said metal part holding means for moving a metal part outwardly in its said holding means.

6. In a glass working machine adapted to embed the end of a metal part in a glass part, in combination, a glass heating means; a work holder movable into and out of operative relation to said glass heating means; said work holder comprising a holder adapted to carry a glass part, and a holder adapted to carry a metal part, said metal part holder being adapted to be in operative relation to said glass heating means when said work holder is thereat, and said glass part holder being mounted for movement toward and from said metal part holder to present the glass part in abutting relation against the metal part; and means operative upon movement of said work holder into operative relation to said glass heating means for moving said glass part holder to said metal part holder and for holding a glass part carried by said glass part holder in abutting relation under pressure against a metal part carried by said metal part holder.

7. In a glass working machine adapted to embed the end of a metal part in a glass part, in combination, a glass heating means, a work holder movable into and out of operative relation to said glass heating means; said work holder comprising a holder adapted to carry a glass part, and a holder adapted to carry a metal part, said metal part holder being adapted to be in operative relation to said glass heating means when said work holder is thereat, and said glass part holder being mounted for movement toward and from said metal part holder to present the glass part in abutting relation against the metal part; and means operative on said glass part holder upon movement of said work holder into operative relation to said glass heating means, for moving said glass part holder to said metal part holder and for holding a glass part carried thereby into abutting relation, under pressure, against a metal part carried by said metal part holder; and means operative upon movement of said work holder in a direction away from said glass heating means for moving said metal part holder away from said glass part holder.

8. In a glass working machine adapted to embed the end of a metal part in a glass part, in combination, a glass heating means, a work holder movable into and out of operative relation to said glass heating means; said work holder comprising a holder adapted to carry a glass part, and a holder adapted to carry a metal part, said metal part holder being adapted to be in operative relation to said glass heating means when said work holder is thereat, and said glass part holder being mounted for movement toward and from said metal part holder to present the glass part in abutting relation against the metal part; and means, operative on said glass part holder upon movement of said work holder into operative relation to said glass heating means, for moving said glass part holder to said metal part holder and including means for holding a glass part carried by said glass part holder in abutting relation, under pressure, against a metal part carried by said metal part holder; and means operative upon movement of said work holder in a direction away from said glass heating means for moving said glass part holder away from said metal part holder.

9. In a glass working machine adapted to embed the end of a metal part in a glass part, in combination, a glass heating means, a work holder movable into and out of operative relation to said glass heating means; said work holder comprising a holder adapted to carry a glass part, and a holder adapted to carry a metal part, said metal part holder being adapted to be in operative relation to said glass heating means when said workholder is thereat, and said glass holder being mounted for movement toward and from said metal part holder to present the glass part in abutting relation against the metal part; and means operative on said glass part holder upon movement of said workholder into operative relation to said glass heating means for moving said glass part holder to said metal part holder and for holding a glass part carried by said glass part holder in abutting relation, under pressure, against a metal part carried by said metal part holder; means for moving a metal part outwardly in said metal part holder; metal in operative relation to said glass part holder and movable thereby when it is moving away from said metal holder for engaging said metal part moving means to actuate it; and means operative upon movement of said work holder in a direction away from said glass heating means for moving said glass part holder away from said metal part holder and to actuate said metal part moving means in metal part moving motion.

10. In a glass working machine adapted for embedding metal parts in glass parts, in combination, a rotatable carrier member; a plurality of work holders on said carrier member, each work holder being equally spaced from the center of rotation of said carrier member and being equally spaced each from the other circumferentially about said center of rotation; a circumferential cam member concentric with said rotatable carrier; each of said work holders comprising means for holding a glass part and means for holding a metal part, said glass part holding means being movable toward, and from said metal part holding means; heating means adjacent said cam at a position adjacent to which said work holders can be moved into operative relation to said heating means by movement with said rotatable carrier; means connected with said glass part holding means and in operative relation to said cam, adapted upon movement of its workholder in a given direction on said rotatable carrier toward said heating means to move said glass holding means toward said metal part holding means.

11. In a glass working machine adapted for embedding metal parts in glass parts, in combination, a rotatable carrier member; a plurality of workholders on said carrier member, each workholder being equally spaced from the center of rotation of said carrier member and being equally spaced each from the other circumferentially about said center of rotation; a circumferential cam member concentric with said rotatable carrier; each of said workholders comprising means for holding a glass part and means for holding a metal part, said glass part holding means being movable toward and from said metal part holding means; heating means adjacent said cam at a position adjacent to which said workholders can be moved into operative relation to by movement with said rotatable carrier; means connected with said glass part holding means and in operative relation to said cam, adapted upon movement of its workholder in a given direction of said rotatable carrier toward said heating means to move said glass holding means to said metal part holding means; and means at said position adapted to engage said glass part holding means moving means and adapted to hold a glass part carried by said glass part holding means under pressure against a metal part carried by said metal part holding means.

12. In a glass working machine adapted for embedding metal parts in glass parts, in combination, a rotatable carrier member; a plurality of workholders on said carrier member, each workholder being equally spaced from the center of rotation of said carrier member and being equally spaced each from the other circumferentially about said center of rotation; a circumferential cam member concentric with said rotatable carrier; each of said workholders comprising means for holding a glass part and means for holding a metal part, said glass part holding means being movable toward and from said metal part holding means; heating means adjacent said cam at a position adjacent to which said workholders can be moved in operative relation to by movement with said rotatable carrier; means connected with said glass part holding means and in operative relation to said cam, adapted upon movement of its workholder in a given direction on said rotatable carrier toward said heating means to move said glass holding means to said metal part holding means; and spring means at said position adapted to engage said glass part holding means moving means are adapted to hold a glass part carried by said glass part holding means under pressure against a metal part carried by said metal part holder.

13. In a glass working machine adapted for embedding metal parts in glass parts, in combination, a rotatable carrier member; a plurality of workholders on said carrier member, each workholder being equally spaced from the center of rotation of said carrier member and being equally spaced each from the other circumferentially about said center of rotation; a circumferential cam member concentric with said rotatable carrier; each of said workholders comprising means for holding a glass part and means for holding a metal part, said glass part holding means being movable toward and from said metal part holding means; heating means adjacent said cam at a position adjacent to which said workholders can be moved in operative relation to said heating means by movement with said rotatable carrier; means connected with said glass part holding means, in operative relation to said cams, adapted upon movement of its workholder in a given direction of said rotatable carrier toward said heating means to move said glass holding means toward said metal part holding means and upon movement in the same direction away from said heating means to move said glass part holding means away from said metal part holding means.

14. In a glass working machine, adapted for embedding metal parts in glass parts, in combination, a rotatable carrier member; a plurality of workholders on said carrier member, each workholder being equally spaced from the center of rotation of said carrier member and being equally spaced each from the other circumferentially about said center of rotation, a circumferential cam member concentric with said rotatable carrier; each of said workholders comprising means for holding a glass part and means for holding a metal part, said glass part holding means being movable toward and from said metal part holding means; heating means adjacent said cam in a position into which said workholders can be moved in operative relation thereto by movement with said rotatable carrier; means connected with said glass part holding means in operative relation to said cam, adapted upon movement of its workholder in a given direction with said rotatable carrier toward said heating means to move said glass holding means toward said metal part holding means and upon movement in the same direction and away from said heating means to move said glass part holding means away from said metal part holding means; and spring means, at said position, adapted to engage said glass part moving means to hold a glass part carried by said glass part holder under pressure against a metal part carried by said metal part holder.

15. A work holder for a glass working machine comprising, a holder member having a glass engaging surface, having a transverse opening therethrough substantially parallel to said surface, and having an opening extending from said surface to said transverse opening; a member in said transverse opening and movable therein toward and from the other said opening; a second holder member having a glass engaging surface facing the first said glass engaging surface, said second holder member being movable with respect to first said holder toward and away from it to carry said surface into closely adjacent positions and spaced apart positions with respect to each other; and means connected with said second holder adapted, during movement away from first said holder, to engage said movable member to move the same toward said other opening and adapted to disengage the same on movement away from said other opening.

16. In a glass working machine, in combination, automatically operating parts comprising a metal holding part and a glass holding part, one movable relatively with respect to another, a rigid cam in operating relation to said relatively movable part and a resilient cam interposed in the line of the operating surface of said rigid cam and adapted to resiliently engage said relatively movable part.

17. In a glass working machine, in combination, automatically operating parts comprising a metal holding part and a glass holding part, one movable relatively with respect to another, a rigid circumferential cam having opposed surfaces in operating relation to said relatively movable part and a resilient cam interposed in the line of one of said surfaces of said rigid cam and adapted to resiliently engage said relatively movable part for yieldably pressing said glass holding part toward said metal holding part.

18. In a glass working machine, in combination, automatically operating parts comprising a metal holding part and a glass holding part, said glass holding part being movable relatively with respect to said metal holding part, said parts being adapted to engage one with the other under pressure, in combination, a rigid circumferential cam in operating relation to said relatively movable glass holding part and a resilient cam interposed in the line of the operating surface of said cam and adapted to resiliently engage said relatively movable part to hold the latter in pressed relation with said metal holding part.

In testimony, that I claim the invention set forth above I have hereunto set my hand this 8th day of February, 1928.

DANIEL KONDAKJIAN.